US007509370B1

(12) United States Patent
Branda et al.

(10) Patent No.: US 7,509,370 B1
(45) Date of Patent: Mar. 24, 2009

(54) METHOD FOR OPTIMIZING PARALLEL PROCESSING OF BACKEND TRANSACTIONS BY PRIORITIZING RELATED TRANSACTIONS

(75) Inventors: Steven J. Branda, Rochester, MN (US); William T. Newport, Rochester, MN (US); John J. Stecher, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,423

(22) Filed: May 15, 2008

(51) Int. Cl.
*G06F 15/16* (2006.01)
(52) U.S. Cl. .................. 709/201; 709/203
(58) Field of Classification Search .......... 709/201, 709/203; 718/103, 104; 714/48; 370/389; 345/505; 704/202, 232; 706/6, 15; 712/213; 717/149
See application file for complete search history.

(56) References Cited

U.S. PATENT DOCUMENTS

| 6,665,814 | B2 | 12/2003 | Hobson et al. |
| 6,848,109 | B1 | 1/2005 | Kühn |
| 7,124,188 | B2 | 10/2006 | Mangipudi et al. |
| 2004/0064817 | A1* | 4/2004 | Shibayama et al. ......... 718/104 |
| 2004/0078724 | A1* | 4/2004 | Keller et al. ................ 714/48 |
| 2004/0202192 | A9* | 10/2004 | Galbi et al. ................. 370/412 |
| 2006/0164978 | A1* | 7/2006 | Werner et al. ............... 370/229 |
| 2007/0253412 | A1* | 11/2007 | Batteram et al. ........... 370/389 |
| 2008/0155550 | A1* | 6/2008 | Tsafrir et al. .............. 718/103 |

* cited by examiner

*Primary Examiner*—Le Luu
(74) *Attorney, Agent, or Firm*—Cantor Colburn LLP

(57) ABSTRACT

The present invention provides a method for optimizing the processing of backend transactions by receiving related transactions for processing from a program executing on a computer, and prioritizing the related transactions by determining: a degree of necessity for each related transaction; and which of the related transactions can be executed in parallel by determining which related transactions depend upon the successful completion of a transaction. The method further includes executing all related transactions that can be in parallel, and do not depend upon the successful completion of a transaction, executing related transactions that depend upon the successful completion of a transaction if it successful completes, canceling execution of any of the related transactions that depend upon the transaction that did not successful complete and has the degree of necessity of critical or best effort, and returning to the program any data resulting from the execution of the related transactions.

1 Claim, 4 Drawing Sheets

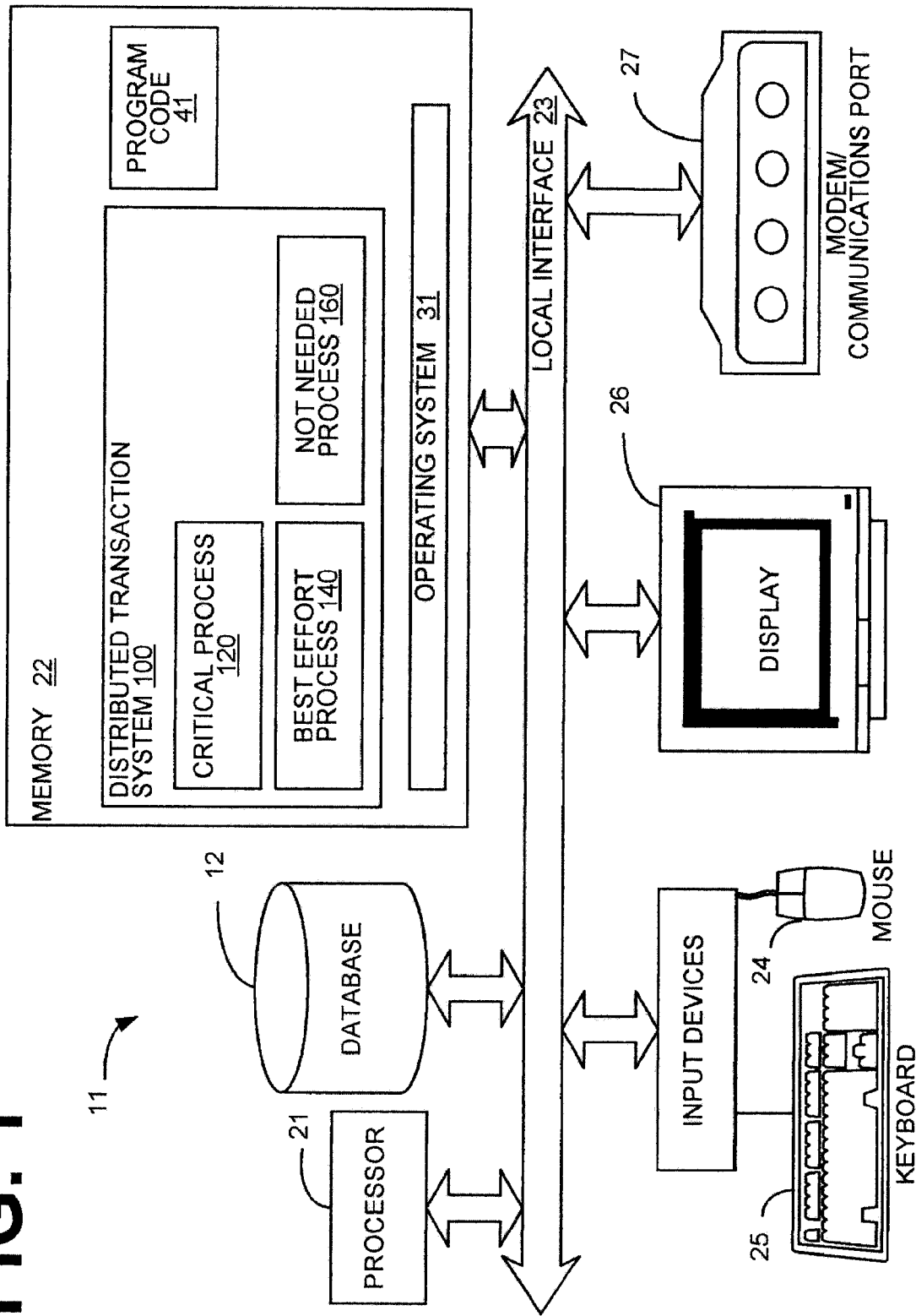

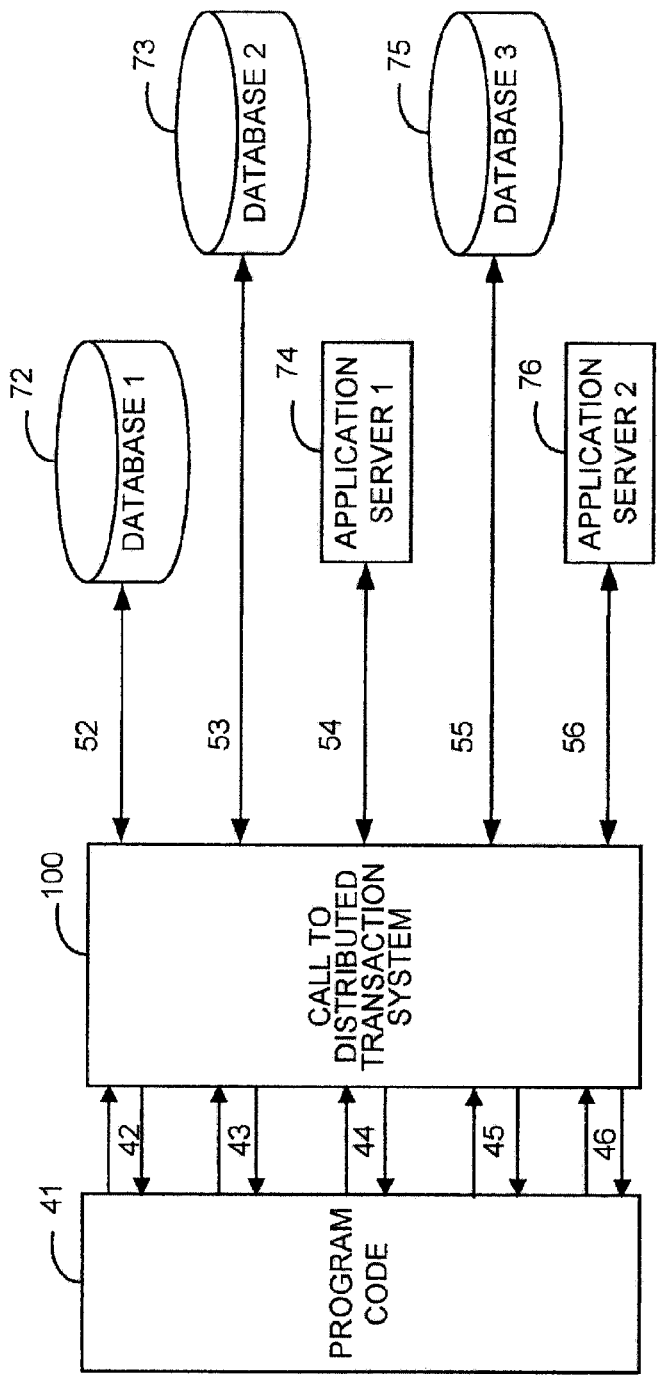

METHOD FOR OPTIMIZING PARALLEL PROCESSING OF BACKEND TRANSACTIONS BY PRIORITIZING RELATED TRANSACTIONS

CROSS-REFERENCE TO RELATED APPLICATION

This application is related to co-pending U.S. patent applications entitled "SYSTEM AND METHOD FOR PROGRAMMATIC DISTRIBUTED TRANSACTION COMMIT PRIORITIZATION MECHANISM", filed on May 15, 2008, by Stecher et al., accorded Ser. No. 12/121,367, which is entirely incorporated herein by reference.

BACKGROUND OF THE INVENTION

1. Field of the Invention

This invention generally relates to methods and apparatus for data transactions and particularly to improve processing of distributed transactions.

2. Description of Background

In today's application server environment there is a good deal of need to be able to execute backend transactions in parallel to complete disjoint business operations to display information to the end user or drive updates to the backend in a highly performant manner. While at the same time, being able to abort incomplete segments of the transactions and still return some data to provide the end user with information. At the moment there are a few mechanisms to perform partially this type of operation inside of an application server with Async Beans being the mechanism inside of WebSphere that allows you to drive multiple backend transactions on separate runtime threads but does not give you the ability to link these transactions together and execute them based on rules.

With the current programming model, if one ends up with one of the backend transactions hanging up in a high level business transaction, one gets into the situation where the application server cannot ever complete the business transaction. This is because it will always roll back because of a timeout. In most cases, this is desirable because atomisity is desired. However, in other cases there are specific backend transactions that make up the larger business transaction that one does not care if it is complete before returning the information back to the end user. One can assume they provide some data that is not critical for the end user.

Therefore, there is a need for backend transaction processing that will overcome the disadvantages of the prior art and provides improved performance even in times of numerous backend transaction failures.

SUMMARY OF THE INVENTION

Embodiments of the present invention provide a system and method for optimizing the processing of backend transactions.

The system includes a module that receives a transaction group comprising a plurality of related transactions for processing from a program executing on a computer, and a module that prioritizes the plurality of related transactions, wherein the prioritizing determines a degree of necessity for each of the plurality of related transactions, wherein the degree of necessity is selected from the group consisting of critical, best effort and not needed, and wherein the prioritizing further determines which of the plurality of related transactions can be executed in parallel by determining which of the plurality of related transactions depend upon the successful completion of at least one transaction in the plurality of related transactions.

The system further includes a module that executes all the plurality of related transactions that can be executed in parallel and do not depend upon the successful completion of the at least one transaction, a module that executes the plurality of related transactions that depend upon the successful completion of the at least one transaction if the at least one transaction successful completes, and a module that cancelles execution of any of the plurality of related transactions that depend upon the at least one transaction, wherein the at least one transaction did not successful complete and wherein the at least one transaction has the degree of necessity selected from the group consisting of critical and best effort, and a module that returns to the program any data resulting from the execution of plurality of related transactions.

Embodiment of the present invention can also be viewed as providing a method for optimizing the processing of backend transactions. In this regard, one embodiment of such a method, among others, can be broadly summarized by the following steps. The method operates by receiving a transaction group comprising a plurality of related transactions for processing from a program executing on a computer, and prioritizing the plurality of related transactions. The prioritizing determines a degree of necessity for each of the plurality of related transactions, wherein the degree of necessity is selected from the group consisting of critical, best effort and not needed, and wherein the prioritizing further determines which of the plurality of related transactions can be executed in parallel by determining which of the plurality of related transactions depend upon the successful completion of at least one transaction in the plurality of related transactions. The method further includes executing all the plurality of related transactions that can be executed in parallel and do not depend upon the successful completion of the at least one transaction, executing the plurality of related transactions that depend upon the successful completion of the at least one transaction if the at least one transaction successful completes, canceling execution of any of the plurality of related transactions that depend upon the at least one transaction, wherein the at least one transaction did not successful complete and wherein the at least one transaction has the degree of necessity selected from the group consisting of critical and best effort, and returning to the program any data resulting from the execution of plurality of related transactions.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a block diagram illustrating an example of a computer utilizing the distributed transaction system of the present invention.

FIG. 2 is a block diagram illustrating an example of the operation of the distributed transaction system of the present invention, as shown in FIG. 1.

FIG. 3 is a block diagram illustrating an example of the elements in a called transaction utilized by the distributed transaction system of the present invention, as shown in FIGS. 1 and 2.

Figure 5:
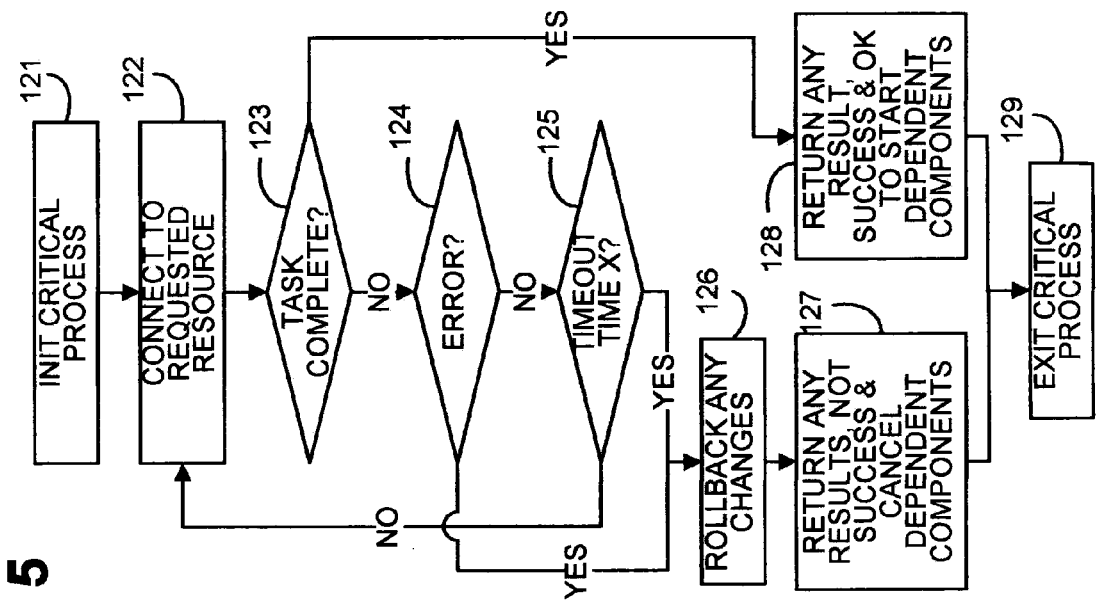
FIG. 5 is a flow chart illustrating an example of the operation of the critical process on a computer that is utilized in the distributed transaction system of the present invention, as shown in FIGS. 1-4.

The detailed description explains the preferred embodiments of the invention, together with advantages and features, by way of example with reference to the drawings.

DETAILED DESCRIPTION OF THE INVENTION

This invention disclosure presents a system and improved method for optimizing the processing of backend transactions.

The present invention demonstrates a new programmatic approach to allow developers to denote which part of the concurrent backend transactions they do not need to have return before the application returns data back to the end users. Thus allowing for a much more flexible presentation layer to be created that has built in handling for none returning uncritical transactions.

An example of when the present invention would significantly improve the performance of an application and provide critical function to developers is when you have something like an internet stock trading application and your main trading page is constructed of multiple different backend systems calls to retrieve various critical (i.e. stock prices) and non-critical data (i.e. today's top stocks). In one case, an internet stock trading application has been addressing an availability issue in that if one of the backend systems goes down they either return an error page for all of their site (i.e. a function as of January 07) or now with their recent code changes execute some fairly complex error processing code to short circuit their transactions and return those segments of their page not returning as being "function not available" (i.e. the current implementation) and still giving back data that it can.

With implementation of the present invention, each specific backend transaction would be run in parallel (number one improving performance). In addition, if there are specific segments of the backend that do not return, there are very easy handling mechanisms for the presentation logic to know that the data was not retrieved and thus allowing it to show the "function not available" messages. Instead of having to implement this code in the application logic of the application, the present invention cuts down significantly on the amount of time required to develop the application that needs to handle these situations by adding in specific annotations that can be used in conjunction with the runtime to perform the same logic out of the box.

The present invention utilizes two parts for implementation, one a developer construct and the other is a runtime mechanism for handling the annotations effects during runtime.

For the developer construct, there it is a set of annotations that can be exploited by developers to denote which part of the parallel backend transactions are critical @critical, which ones are best effort @besteffort, and which ones are not necessary @notneeded. The overall transaction gets an annotation, as well that states the timeout of the transactions for the annotated segments. This timeout tells the runtime mechanism when to cut off execution of those specific backend threads of execution.

It is implied here is that a transaction 'component' is embodied in a method, and the annotations described here are targeted to that method. In addition, each annotation can define a unique id for the transaction component via a name property.

An example of this is @besteffort(name="userportfolio")

Subsequently other transaction component can communicate their need to be executed after other components by a dependon property.

An example of this is @notneeded (dependson="userportfolio, userlogin")

A limitation for this model is that a component cannot depend on another component with a less restrictive return requirement. For example a @besteffort component cannot depend on a @notneeded component.

An computer system at runtime picks up the annotations and timeout settings and then coordinates the runtime internally to ensure that transactions that can be execute in parallel are started as such. As each transaction is started and the threads are spun up or released from a thread pool. A coordinator thread is started as well that has the timeout values set in it. The parallel backend threads are started and the coordinator thread monitors them watching and waiting for the critical annotated threads to complete. Once they complete it checks and sees if the other threads have completed. If the annotated threads haven't completed then the coordinator thread checks the timeout and sees if the timeout has expired. If it has expired, it returns the data that has gotten processed so far. If it hasn't expired the coordinator thread sleeps until the timeout and then wakes back up to see if the transactions have completed. It then either returns all the data or what data has completed. All transactions that have not completed by the timeout are forced to abort by killing the thread and/or discarding the results when they do return.

Referring now to the drawings, in which like numerals illustrate like elements throughout the several views. FIG. 1 is a block diagram illustrating an example of a computer 11 utilizing the distributed transaction system 100 of the present invention. Computer 11 includes, but is not limited to, PCs, workstations, laptops, PDAs, palm devices and the like. Generally, in terms of hardware architecture, as shown in FIG. 1, the computer 11 include a processor 21, memory 22, and one or more input and/or output (I/O) devices (or peripherals) that are communicatively coupled via a local interface 23. The local interface 23 can be, for example but not limited to, one or more buses or other wired or wireless connections, as is known in the art. The local interface 23 may have additional elements, which are omitted for simplicity, such as controllers, buffers (caches), drivers, repeaters, and receivers, to enable communications. Further, the local interface 23 may include address, control, and/or data connections to enable appropriate communications among the aforementioned components.

The processor 21 is a hardware device for executing software that can be stored in memory 22. The processor 21 can be virtually any custom made or commercially available processor, a central processing unit (CPU), data signal processor (DSP) or an auxiliary processor among several processors associated with the computer 11, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 22 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 22 may incorporate electronic, magnetic, optical, and/or other types of storage media. Note that the memory 22 can have a distributed architecture, where various components are situated remote from one another, but can be accessed by the processor 21.

The software in memory 22 may include one or more separate programs, each of which comprises an ordered listing of executable instructions for implementing logical functions. In the example illustrated in FIG. 1, the software in the memory 22 includes a suitable operating system (O/S) 31, program code 41 and distributed transaction system 100 of the present invention. As illustrated, the distributed transaction system 100 of the present invention comprises numerous functional components including, but not limited to, the critical process 120, bestefforts process 140 and notneeded process 160.

A non-exhaustive list of examples of suitable commercially available operating systems 31 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 31 essentially controls the execution of other computer programs, and provides scheduling, input-output control, file and data management, memory management, and communication control and related services. It is contemplated by the inventors that the distributed transaction system 100 of the present invention is applicable on all other commercially available operating systems.

The distributed transaction system 100 may be a source program, executable program (object code), script, or any other entity comprising a set of instructions to be performed. When a source program, then the program is usually translated via a compiler, assembler, interpreter, or the like, which may or may not be included within the memory 22, so as to operate properly in connection with the O/S 31. Furthermore, the distributed transaction system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices, for example but not limited to, a mouse 24, keyboard 25, scanner (not shown), microphone (not shown), etc. Furthermore, the I/O devices may also include output devices, for example but not limited to, a printer (not shown), display 26, etc. Finally, the I/O devices may further include devices that communicate both inputs and outputs, for instance but not limited to, a NIC or modulator/demodulator 27 (for accessing remote devices, other files, devices, systems, or a network), a radio frequency (RF) or other transceiver (not shown), a telephonic interface (not shown), a bridge (not shown), a router (not shown), etc.

If the computer 11 is a PC, workstation, intelligent device or the like, the software in the memory 22 may further include a basic input output system (BIOS) (omitted for simplicity). The BIOS is a set of essential software routines that initialize and test hardware at startup, start the O/S 31, and support the transfer of data among the hardware devices. The BIOS is stored in some type of read-only-memory, such as ROM, PROM, EPROM, EEPROM or the like, so that the BIOS can be executed when the computer 11 is activated.

When the computer 11 is in operation, the processor 21 is configured to execute software stored within the memory 22, to communicate data to and from the memory 22, and to generally control operations of the computer 11 are pursuant to the software. The distributed transaction system 100 and the O/S 31 are read, in whole or in part, by the processor 21, perhaps buffered within the processor 21, and then executed.

When distributed transaction system 100 is implemented in software, as is shown in FIG. 1, it should be noted that the distributed transaction system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method.

The distributed transaction system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In an alternative embodiment, where the distributed transaction system 100 is implemented in hardware, the distributed transaction system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 2 is a block diagram illustrating an example of the operation of the distributed transaction system 100 of the present invention, as shown in FIG. 1. The program code 41 at runtime picks up the annotations and timeout settings in a call to the distributed transaction system 100. The distributed transaction system 100 coordinates the runtime to ensure that transactions that can be executed in parallel are started as such. As each transaction is started and the threads are spun up or released from a thread pool.

As shown, transaction 42 from program code 41 is processed by the distributed transaction system 100 in a call 52 to database 72. In the illustrated example, one can imagine that the transaction 42 to database 72 must be successfully completed before transaction 43 to database 73 can be started. The transaction component can be illustrated by the following.

{@critical(name="database 1") and
[@besteffort(name="database 2", dependson="database 1") OR
@notneeded(name="database 2", dependson="database 1")]}

The transaction component could also be illustrated by the following.

{@besteffort(name="database 1") and
@notneeded(name="database 2", dependson="database 1")}

The same logic also applies to transaction 44 with application server 74 that must be completed prior to starting transaction 45 with database 75. In one embodiment, the unsuccessful completion of the @notneeded transaction causes the cancellation of any dependent components (i.e. transactions or connections to a resource). In another embodiment, the unsuccessful completion of the @notneeded transaction need not cancel any dependent components (i.e. transactions or connections to a resource) upon an unsuccessful completion. The dependson property then only indicates the subsequent transaction needs to be executed after the completion of a prior transaction or task.

@notneeded(name="application server 1") and
@ notneeded(name="database 3", dependson="application server 1").

It is also shown that transaction 46 to application server 76 is a stand-alone type of transaction.

FIG. 3 is a block diagram illustrating an example of the elements in a called transaction 80 utilized by the distributed transaction system 100 of the present invention, as shown in FIGS. 1 and 2.

The called transaction 80 contains entries describing the resource or method called 81, priority of the transaction 82, and any prior transactions that the current called transaction 80 dependson 83. Also shown are the entries for indicating success 84 and any data to be returned in the return result 85. The success 84 entry can be indicated with any number of types of nomenclature. However, it is contemplated by the inventors of the present invention that a simple one value indicates the successful completion of the transaction, and zero value indicates the occurrence of a failed transaction.

The return result 85 is a variable length and can contain such information as the transaction data generated. The transaction data generated may be any type of data that includes but is not limited to, access to a database (i.e. database records), webpage data, which it data, identification of the provider of the transaction (i.e., program, workstation or user); time and date of issue; a unique identifier issued by the data provider for the transaction; the exact transaction issued; and the address of all the data affected, as well as a copy of the value just before and/or just after the change.

Figure 4:
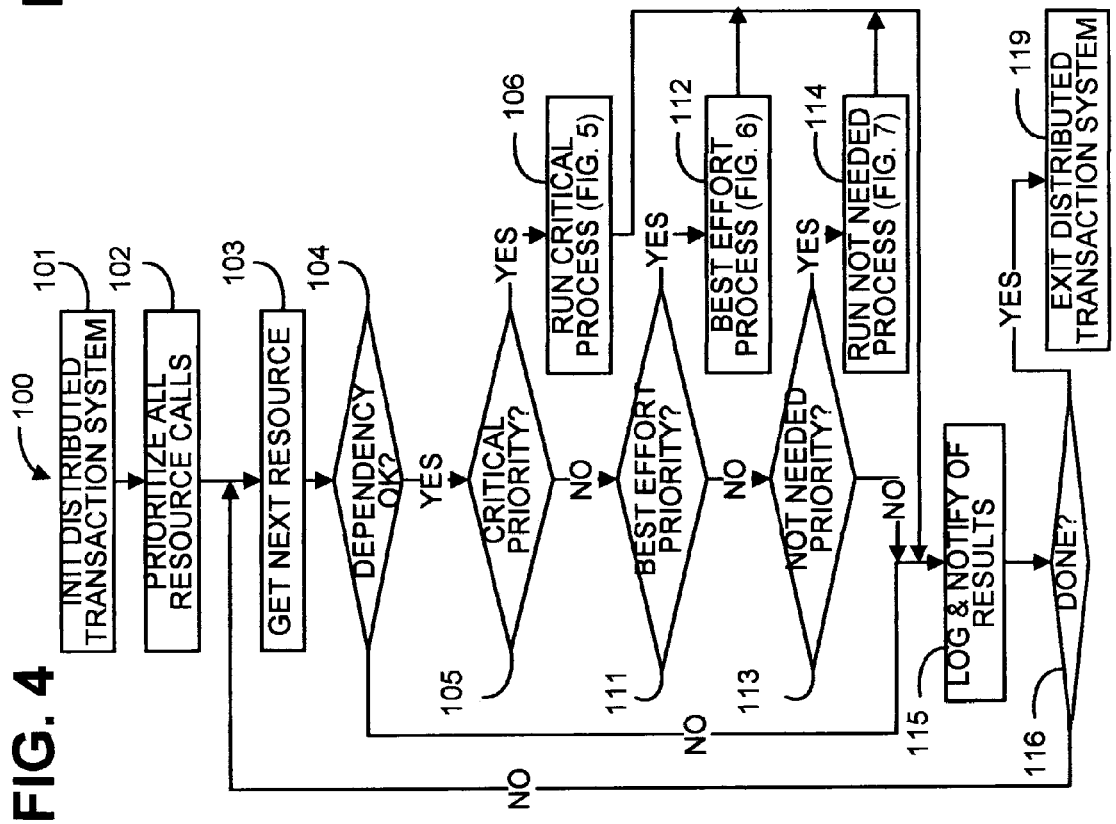
FIG. 4 is a flow chart illustrating an example of the operation of the distributed transaction system of the present invention, as shown in FIGS. 1-3.

FIG. 4 is a flow chart illustrating an example of the operation of the distributed transaction system 100 of the present invention, as shown in FIGS. 1 and 2. The distributed transaction system 100 provides a mechanism to utilize a set of annotations that can be exploited by developers to denote which part of the parallel backend transactions are critical @critical, which ones are best effort @besteffort and which ones are not necessary @notneeded.

The distributed transaction system 100 has the timeout values set in it. The parallel backend threads are started and the coordinator thread monitors them watching and waiting for the critical annotated threads to complete. Once they complete, the distributed transaction system 100 checks and sees if the other threads have completed. If the annotated threads haven't completed then the distributed transaction system 100 checks the timeout and sees if the timeout has expired. If it has expired, the distributed transaction system 100 returns the data that has gotten processed so far. If the annotated threads haven't expired, the distributed transaction system 100 sleeps until the timeout and then wakes back up to see if the transactions have completed. The distributed transaction system 100 then either returns all the data or what data has completed. All transactions that have not completed by the timeout are forced to abort (i.e. killing the thread) and/or discarding the results when they do return.

First at step 101, the distributed transaction system 100 is initialized. This initialization may include startup routines and processes embedded in the BIOS of the computer 11. The initialization also includes the establishment of data values for particular data structures utilized in the distributed transaction system 100.

At step 102, the distributed transaction system 100 receives and prioritizes all of the transactions (i.e. resource calls) from program 41. It is in this way that the identification of the transactions (i.e. processes), they can be executed in parallel are identified. It is also at this time that multiple dependent transactions can be identified and placed in priority order (i.e. a transaction hierarchy).

At step 103, the first (i.e. next) resource or transaction is acquired for processing. At step 104, it is determined if a dependency condition for the called transaction 80 exists. A dependency condition includes, but is not limited to, the acknowledgment that a resource or transaction was completed or that a resource or transaction was successfully completed. There may be instances where are the successful completion of a resource or transaction is not needed for the dependent resource or transaction to execute. However, it is generally understood that the successful completion of the predecessor resource or transaction must occur before the depending resource or transaction may be executed if the predecessor resource or transaction is marked as critical or best efforts. If it is determined at step 104 that the dependency for the current resource or transaction is not okay, then the distributed transaction system 100 proceeds to step 115 to place an entry into a log and/or notify the user of a failed dependency chain.

However, if it is determined at step 104 that the dependency for the current resource or transaction is okay, then the distributed transaction system 100 determines if the current transaction has a critical priority at step 105. If it is determined that the current transaction is not a critical priority, then the distributed transaction system 100 skips to step 111. However, if it is determined that the current transaction as a critical priority, then the distributed transaction system 100 runs the critical process (i.e. thread), at step 105, The critical process is herein defined in further detail with regard to FIG. 5. The distributed transaction system 100 then proceeds to step 115 to log or notify the user of any return result from the critical process.

At step 111, the distributed transaction system 100 determines if the current transaction has a best efforts priority. If it is determined that the current transaction does not have a best efforts priority, then the distributed transaction system 100 skips to step 113. However, if it is determined that the current transaction has a best efforts priority, then the distributed transaction system 100 runs the bestefforts process (i.e. thread), at step 112. The bestefforts process is herein defined in further detail with regard to FIG. 6. The distributed transaction system 100 then proceeds to step 115 to log or notify the user of any return result from the bestefforts process.

At step 113, the distributed transaction system 100 determines if the current transaction has a not needed priority. If it is determined that the current transaction does not have a not needed priority, then the distributed transaction system 100 skips to step 115 to notify the user that the transaction (i.e. resource call) did not have a priority assigned. However, if it is determined that the current transaction has a not needed priority, then the distributed transaction system 100 runs the notneeded process (i.e. thread), at step 114. The notneeded process is herein defined in farther detail with regard to FIG. 7. The distributed transaction system 100 then proceeds to step 115 to log or notify the user of any return result from the notneeded process.

At step 115 the distributed transaction system 100 logs and/or notifies a user of any bad or unprocessed transactions. At step 116, the distributed transaction system 100 determines if there are more transactions to be processed. If it is determined at step 116 that there are more transactions to be processed, then the distributed transaction system 100 returns to repeat steps 103 through 116. However, if it is determined at step 116 that there are no more transactions to be processed, then the distributed transaction system 100 exits at step 119.

FIG. 5 is a flow chart illustrating an example of the operation of the critical process 120 on the computer 11 that is utilized in the distributed transaction system 100 of the present invention, as shown in FIGS. 1-4. The critical process 120 in the distributed transaction system 100 processes those transactions that must be successfully performed or that the transaction must be rolled back.

First at step 121, the critical process 120 is initialized. This initialization may include startup routines and processes embedded in the BIOS of the computer 11. The initialization also includes the establishment of data values for particular data structures utilized in the critical process 120.

At step 122, the critical process 120 attempts to connect to the requested resource or processes the requested transaction (i.e. performs the required task). At step 123, the critical process 120 determines if the task has been successfully completed. If it is determined at step 123 that the task has been successfully completed, then a critical process 120 proceeds to step 127 to indicate the successful completion of the task.

However, if it is determined at step 123 that the task has not been completed, then the critical process 120 tests if an error has occurred in the processing of the task. If it is determined at step 124, that an error has occurred in the processing of the task, then the critical process 120 proceeds to step 126 to rollback the transaction and indicate the unsuccessful completion of the task.

However, if it is determined at step 124 that an error has not occurred in the processing of the task, then the critical process 120 tests if timeout (i.e. reaching of the maximum time limit for processing) has occurred in the processing of the task at step 125. If it is determined at step 125, that a timeout has occurred in the processing of the task, then the critical process 120 then proceeds to step 126 to indicate the unsuccessful completion of the task because of reaching the maximum allowable time for processing. However, if it is determined at step 125 that a timeout has not occurred, then the critical process 120 returns to step 122 in order to retry the task.

At step 126, the critical process 120 then rolls back any changes caused by the connection to the requested resource or processing of a transaction. At step 127, the critical process 120 returns any result generated all along with a not successful completion indication. The not successful completion indication will cause any dependent components to be canceled from execution. The critical process 120 then skips to step 129.

At step 128, the critical process 120 returns to the distributed transaction system 100 any results of successfully completed task and an indication of a successful completion. The indication of its successful completion indicates that it is okay to start any dependent components. At step 129, the critical process 120 then exits.

Figure 6:
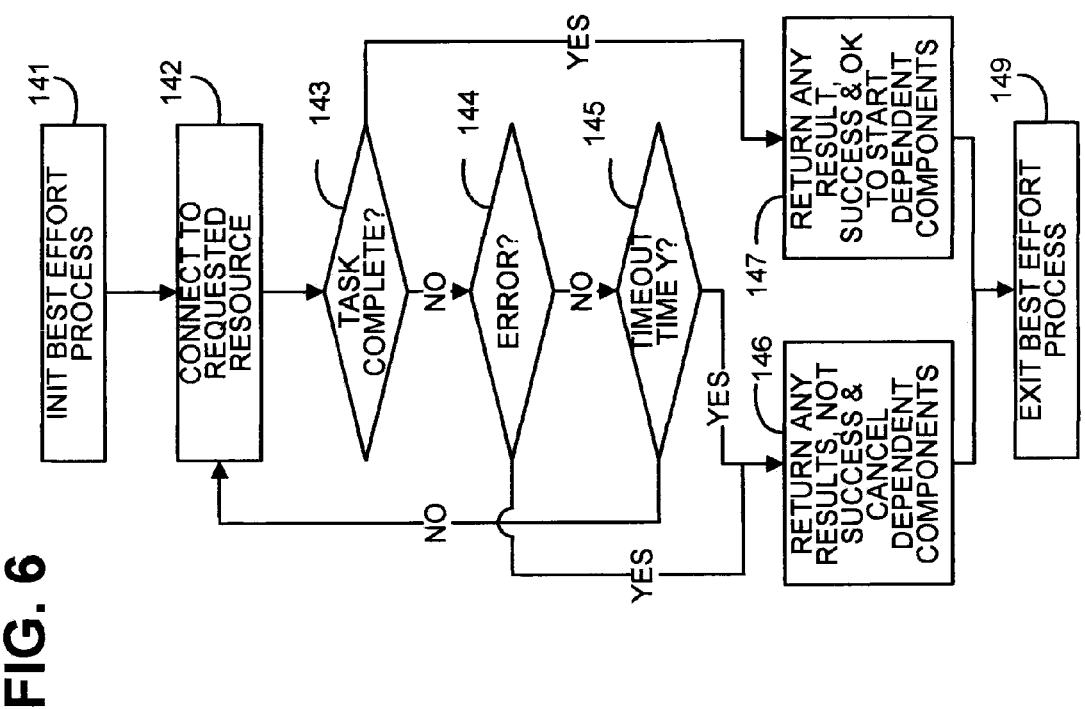
FIG. 6 is a flow chart illustrating an example of the operation of the besteffort process on a computer that is utilized in the distributed transaction system of the present invention, as shown in FIGS. 1-4.

FIG. 6 is a flow chart illustrating an example of the operation of the bestefforts process 140 on a computer 11 that is utilized in the distributed transaction system 100 of the present invention, as shown in FIGS. 1-4. The bestefforts process 140 in the distributed transaction system 100 processes those transactions that should be successfully performed or that the user be notified of unsuccessful completion.

First at step 141, the bestefforts process 140 is initialized. This initialization may include startup routines and processes embedded in the BIOS of the computer 11. The initialization also includes the establishment of data values for particular data structures utilized in the bestefforts process 140.

At step 142, the bestefforts process 140 attempts to connect to the requested resource or processes the requested transaction (i.e. performs the required task). At step 143, the bestefforts process 140 determines if the task has been successfully completed. If it is determined at step 143 that the task has been successfully completed, then the bestefforts process 140 proceeds to step 147 to indicate the successful completion of the task.

However, if it is determined at step 143 that the task has not been completed, then the bestefforts process 140 tests if an error has occurred in the processing of the task. If it is determined at step 144, that an error has occurred in the processing of the task, then the bestefforts process 140 then proceeds to step 146 to indicate the unsuccessful completion of the task and cancel any dependent components (i.e. transactions or connections to a resource).

However, if it is determined at step 144 that an error has not occurred in the processing of the task, then the bestefforts process 140 tests if timeout (i.e. reaching of the maximum time limit for processing) has occurred in the processing of the task at step 145. If it is determined at step 145, that a timeout has occurred in the processing of the task, then the bestefforts process 140 then proceeds to step 146 to indicate the unsuccessful completion of the task because of reaching the maximum allowable time for processing. However, if it is determined at step 145 that a timeout has not occurred, then the bestefforts process 140 returns to step 142 in order to retry the task.

At step 146, the bestefforts process 140 returns any result generated all along with a not successful completion indication, which will cause the user to be notified of the unsuccessful completion. The not successful completion indication will cause any dependent components to be canceled from execution. The bestefforts process 140 then skips to step 149.

At step 147, the bestefforts process 140 returns to the distributed transaction system 100 any results of successfully completed task and an indication of a successful completion. The indication of its successful completion indicates that it is okay to start any dependent components. At step 149, the bestefforts process 140 then exits.

Figure 7:
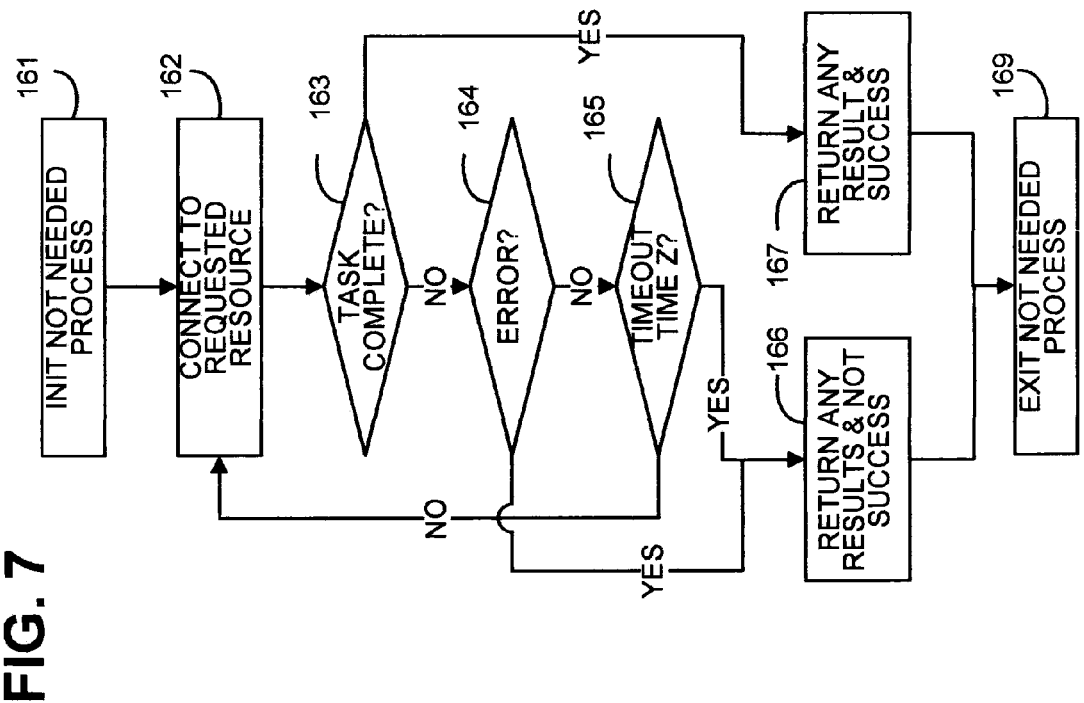
FIG. 7 is a flow chart illustrating an example of the operation of the notneeded process on a computer that is utilized in the distributed transaction system of the present invention, as shown in FIGS. 1-4.

FIG. 7 is a flow chart illustrating an example of the operation of the notneeded process 160 on a computer 11 that is utilized in the distributed transaction system 100 of the present invention, as shown in FIGS. 1-4. The notneeded process 160 in the distributed transaction system 100 processes those transactions that should be successfully performed or that the user be notified of unsuccessful completion.

First at step 161, the notneeded process 160 is initialized. This initialization may include startup routines and processes embedded in the BIOS of the computer 11. The initialization also includes the establishment of data values for particular data structures utilized in the notneeded process 160.

At step 162, the notneeded process 160 attempts to connect to the requested resource or processes the requested transaction (i.e. performs the required task). At step 163, the notneeded process 160 determines if the task has been successfully completed. If it is determined at step 163 that the task has been successfully completed, then the notneeded process 160 proceeds to step 167 to indicate the successful completion of the task.

However, if it is determined at step 163 that the task has not been completed, then the notneeded process 160 tests if an error has occurred in the processing of the task. If it is determined at step 164, that an error has occurred in the processing of the task, then the notneeded process 160 then proceeds to step 166 to indicate the unsuccessful completion of the task.

However, if it is determined at step 164 that an error has not occurred in the processing of the task, then the notneeded process 160 tests if timeout (i.e. reaching of the maximum time limit for processing) has occurred in the processing of the task at step 165. If it is determined at step 165, that a timeout has occurred in the processing of the task, then the notneeded process 160 then proceeds to step 166 to indicate the unsuccessful completion of the task because of reaching the maximum allowable time for processing. However, if it is determined at step 165 that a timeout has not occurred, then the notneeded process 160 returns to step 162 in order to retry the task.

At step 166, the notneeded process 160 returns any result generated all along with a not successful completion indication, which will cause the user to be notified of the unsuccessful completion. In one embodiment, the unsuccessful completion of the task causes the notneeded process 160 to cancel any dependent components (i.e. transactions or connections to a resource). In another embodiment, the notneeded prioritization of the task need not cancel any dependent components (i.e. transactions or connections to a resource) upon an unsuccessful completion. The dependson 83 property only indicates the subsequent transaction needs to be executed after the completion of a prior transaction or task. The notneeded process 160 then skips to step 169.

At step 167, the notneeded process 160 returns to the distributed transaction system 100 any results of successfully completed task and an indication of a successful completion. The indication of its successful completion indicates that it is okay to start any dependent components. At step 169, the notneeded process 160 then exits.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for optimizing the processing of backend transactions, comprising:

receiving a transaction group comprising a plurality of related transactions for processing from a program executing on a computer;

prioritizing the plurality of related transactions, wherein the prioritizing determines a degree of necessity for each of the plurality of related transactions, wherein the degree of necessity is selected from the group consisting of critical, best effort and not needed, wherein the prioritizing further determines which of the plurality of related transactions can be executed in parallel by determining which of the plurality of related transactions depend upon the successful completion of at least one transaction in the plurality of related transactions;

executing all the plurality of related transactions that can be executed in parallel and do not depend upon the successful completion of the at least one transaction;

executing the plurality of related transactions that depend upon the successful completion of the at least one transaction if the at least one transaction successful completes;

cancelling execution of any of the plurality of related transactions that depend upon the at least one transaction, wherein the at least one transaction did not successful complete and wherein the at least one transaction has the degree of necessity selected from the group consisting of critical and best effort; and returning to the program any data resulting from the execution of plurality of related transactions.

* * * * *